(12) United States Patent  
Kolinummi et al.

(10) Patent No.: US 7,032,117 B2  
(45) Date of Patent: Apr. 18, 2006

(54) DYNAMIC POWER CONTROL IN INTEGRATED CIRCUITS

(75) Inventors: Pasi Kolinummi, Tampere (FI); Juhani Vehviläinen, Tampere (FI)

(73) Assignee: Nokia Corporation, Espoo (FI)

( * ) Notice: Subject to any disclaimer, the term of this patent is extended or adjusted under 35 U.S.C. 154(b) by 496 days.

(21) Appl. No.: 10/323,577

(22) Filed: Dec. 19, 2002

(65) Prior Publication Data

US 2003/0131268 A1 Jul. 10, 2003

(30) Foreign Application Priority Data

Dec. 20, 2001 (FI) .................................. 20012535

(51) Int. Cl.
*G06F 1/23* (2006.01)
(52) U.S. Cl. ...................... 713/300; 713/320; 713/321; 713/323; 713/324
(58) Field of Classification Search ................ 713/300, 713/320, 321, 323, 324
See application file for complete search history.

(56) References Cited

U.S. PATENT DOCUMENTS

| | | | | |
|---|---|---|---|---|
| 5,388,265 A | * | 2/1995 | Volk | ........................... 713/322 |
| 5,511,203 A | * | 4/1996 | Wisor et al. | ................. 713/322 |
| 5,623,234 A | * | 4/1997 | Shaik et al. | ................... 331/49 |
| 5,910,930 A | * | 6/1999 | Dieffenderfer et al. | ..... 368/156 |
| 5,918,061 A | * | 6/1999 | Nikjou | ....................... 713/324 |
| 6,085,325 A | | 7/2000 | Jackson et al. | |
| 6,088,806 A | | 7/2000 | Chee | |
| 6,243,399 B1 | | 6/2001 | Kaewell et al. | |
| 6,735,454 B1 | * | 5/2004 | Yu et al. | ...................... 455/574 |
| 6,785,826 B1 | * | 8/2004 | Durham et al. | ............. 713/300 |
| 6,895,520 B1 | * | 5/2005 | Altmejd et al. | ............. 713/324 |

\* cited by examiner

*Primary Examiner*—Thomas C. Lee
*Assistant Examiner*—Vincent Tran

(57) ABSTRACT

A method and device is disclosed for implementing dynamic power control in an electronic system implemented on an integrated circuit, which electronic system comprises at least one or several hardware units (201, 202, 203), a hardware based power control logic (204) substantially implemented with logic circuits, as well as a programmable power control mode register (208) containing information about powered-down modes defined for said one or more hardware units. To transfer a single hardware unit (201, 202, 203) from the powered-down mode to the operational mode, the hardware unit transmits to the power control logic (204) a first level sensitive status signal (201*a*, 202*a*, 203*a*) for transferring the hardware unit from the powered-down mode to the wake up mode, and further a second level sensitive status signal (201*b*, 202*b*, 203*b*) for transferring the hardware unit from the wake up mode to the actual operating mode.

10 Claims, 3 Drawing Sheets

DYNAMIC POWER CONTROL IN INTEGRATED CIRCUITS

CROSS REFERENCE TO RELATED APPLICATIONS

This application claims priority under 35 USC §119(a) to Finnish Patent Application No. 20012535 filed on Dec. 20, 2001.

FIELD OF THE INVENTION

The present invention relates to a method for dynamic power control to minimize the power consumption in integrated circuits, particularly in application specific integrated circuits (ASIC). The invention also relates to a power control system implementing such a method.

BACKGROUND OF THE INVENTION

Integrated circuits (abbreviated IC) are widely used in the implementation of various electronic devices. In a number of applications, for example in mobile stations or other battery-operated compact and portable devices, the power consumption of integrated circuits contained in the devices is a very essential factor to be considered in the design and implementation of the devices. Low power consumption makes e.g. longer operating times possible without increasing the physical size of the devices.

In ASIC circuits, as well as in other integrated circuits, the power consumption can be either static or dynamic in nature. In this context, static power consumption refers to the power consumption of the circuit in a situation, in which the circuit is in the idle state, not executing any actual functions but with the operating voltage turned on. In a corresponding manner, dynamic power consumption refers to the power consumption when the circuit is executing its functions. The quantity of dynamic power consumption varies according to the functions executed by the circuit at the time.

The static power consumption of ASIC circuits is largely determined by the processing technique used in the manufacture of the circuits, and thus it cannot be significantly influenced by the design of the functionality of the circuits. In circuit designing, determining the functions to be included in the ASIC circuit being designed, it is, however, possible to significantly influence the dynamic power consumption of the circuit. In principle, the most important factors on the power consumption of the ASIC circuit are the capacitance, the operating voltage, and the clock frequency of the circuit. In the design, the capacitance is determined e.g. on the basis of the surface areas of the components to be implemented on the circuit, and the capacitance of the circuit cannot be influenced at a later stage during the actual use of the circuit. However, the operating voltage and the clock frequency of the circuit can also be changed during the use, wherein it is further possible to affect the dynamic power consumption of the circuit. It is thus an aim of the present invention to control these last-mentioned parameters as effectively as possible, to minimize the dynamic power consumption of the circuit in different use situations.

U.S. Pat. No. 5,910,930 describes a solution for dynamic power control to minimize the power consumption in a microprocessor which comprises several hardware units with different functions. According to U.S. Pat. No. 5,910, 930 and the appended FIG. 1, each of said hardware units 107 involves, as an input, a clock and control signal 103 and, as an output, a powered-down mode enable signal 104. The operation of the hardware units 107, utilizing said signals, is controlled by a clock and power management subsystem 100 included in the microprocessor and comprising a clock generation and control logic 101 and a powered-down mode register 102.

When a given hardware unit 107 activates its powered-down mode enable signal 104, the clock and power management subsystem 100 is thus informed that said hardware unit 107 is ready for the transfer to the powered-down mode. By using signals 105, 106, a register control logic 109 stores information in the powered-down mode register 102 about the type of powered-down mode in which the hardware unit 107 can be transferred. The clock generation and control logic 101 will now combine the information included in the signals 104 and 108 and transfer, by means of the clock and control signal 103, said hardware unit 107 to the suitable powered-down mode. In other words, the clock signal to be transferred to the hardware unit 107 is run down, or the frequency of the clock signal is suitably lowered. When the hardware unit 107 informs, by changing the state of the powered-down mode enable signal 104, the management subsystem 101 about its need to restore the normal mode, the control logic 101 will reset the clock signal to be transferred to the hardware unit 107 to normal. If the hardware unit 107 needs to re-enter the powered-down mode defined in the powered-down mode register 102, this will be effected by reactivating the powered-down mode enable signal 104.

The advantages of the solution presented in U.S. Pat. No. 5,910,930 are based on the fact that the hardware unit 107 can quickly enter or leave the powered-down mode simply by changing the state of the powered-down mode enable signal 104. In other words, the clock generation and control logic 101 is implemented by means of logic circuits as a combination logic, wherein the operation of said unit 101 is fast and does not require software operations.

In prior art, there are also known solutions implemented by software and based on so-called state machines, in which information about the states of different hardware units and also the decision on directing the different hardware units to a suitable powered-down mode are processed by programming. However, state machines or the like, implemented by software, have the drawback that they must be allocated resources, such as a memory, on the integrated circuit. The use of state machines will also require that the processor unit belonging to the system is kept active, which increases the power consumption. Furthermore, the software processing and storage of powered-down modes allowed for the states and different hardware units in a system will significantly increase delays upon turning the powered-down mode on and off. This will cause problems particularly in such solutions in which schedules are designed to be critical so that the too late activation of a hardware unit from the powered-down mode to the operating mode, or vice versa, will interfere with other processes or hardware units in the system by causing delays or actual malfunctions.

The above-presented dynamic powered-down solutions of prior art have proven to be unsatisfactory, particularly in solutions requiring very aggressive power saving but still precisely predictable system response times. When using solutions of prior art, particularly in more complex systems comprising several hardware units, the delay times for "energizing" the system to operation from the powered-down mode to a standby mode are very difficult to predict under changing conditions, wherein, to be on the safe side, the system must be energized slightly in advance, before the moment when the system should be ready for operation at the latest. Thus, when the system is ready for operation but it does not yet execute any actual function, it unnecessarily consumes energy.

An example of such an application is a battery-operated mobile station, in which the mobile station should be able to continuously keep its power consumption as low as possible to maximize the operation time but at the same time, however, be synchronized with a base station to maintain readiness for operation.

SUMMARY OF THE INVENTION

It is an aim of the present invention to provide a new solution for dynamic power control to minimize the power consumption in integrated circuits, particularly in application specific integrated circuits, in such a way that the above-presented problems of prior art are avoided by the invention.

As known from prior art as such, also in the power control system of the invention, the power control logic for controlling the power saving of single hardware units is implemented by means of a combinatorial logic using logic circuits, to avoid extra delays as well as the consumption of power and resources caused by software operations (state machines or the like). On the basis of status data obtained from a single hardware unit by means of a level sensitive status signal, said control logic transfers said hardware unit to a suitable powered-down mode which is defined in the data stored in a powered-down mode register.

However, in a manner different from the state of art, the energizing from the powered-down mode to the operating mode is now, according to the invention, effected via an intermediate step, a so-called wake up mode, in a way that will be described below.

According to the invention, a single hardware unit will first inform, by means of a so-called first level sensitive status signal, the power control logic about its need to enter the wake up mode. After this, when the hardware unit informs, by means of a so-called second level sensitive status signal, the power control logic about the entry into the actual operating mode, the power control logic will transfer the hardware unit to the operating mode, in which operating mode the hardware unit is now, after a known short delay, ready to execute the desired function.

The essential idea of the invention is thus that the wake up mode is formed between the powered-down mode and the operating mode, which wake up mode is characterized in that the transfer from the wake up mode to the actual operating mode always takes place with a precisely known short delay, and that the power consumption is, in any case, always lower in the wake up mode than in the actual operating mode. Preferably, the transfer from the wake up mode to the operating mode substantially takes place without a delay, wherein after the activation of the second status signal, said hardware unit is immediately ready to execute functions.

The invention makes it possible to save power in a more effective and aggressive way than in solutions of prior art; that is, the hardware units can be kept as long as possible in the actual powered-down mode or in the wake up mode of the invention. By means of the invention, however, the system response times remain known, because after the activation of the second status signal, said hardware unit is always ready for operation after a given delay with a known duration of time. In difference to prior art, this also makes it possible to execute functions which require precise execution in real time, in a faultless manner, because as said delay is now known, the delay can be taken into account in the programming of the operations of the system.

In an advantageous embodiment of the invention, the entry of the hardware unit in the powered-down mode will affect not only the clock frequency but also the operating voltage to be supplied to said hardware unit. This will further reduce the power consumption in the powered-down mode.

From the point of view of the operation of the invention, it is essential that said first and/or second status signals transferred from the hardware unit to the power control logic, and/or the so-called requirement signal transferring information from the power control mode register to the power control logic are level sensitive signals which are, by means of their different voltage levels (corresponding to the logical 0 and 1 states in digital binary logic), arranged to continuously indicate the status of said data. Thus, the control logic consisting of power control logic circuits will, fast and without software intervention, react to changes in the state of said signals and further control the power saving, i.e. the clock frequency or operating voltage supplied to the hardware unit, as required in each situation. The measures requiring software intervention are substantially limited only to the defining of powered-down modes to be stored in advance in the powered-down mode register, which is typically performed when the system is run up.

By means of the invention, it is possible, for example, to provide effective power saving functions on an ASIC circuit without reducing the response times of the functions of said circuit. By means of the invention, there is no need to continuously maintain information about the operating state of the system in a separate state machine or the like, whose implementation, as known from prior art, requires a memory and also other resources of the system. Consequently, the invention significantly simplifies the structure and testing of the system to be implemented, for example, on an ASIC circuit, compared with solutions of prior art.

In the solution of the invention, the operation of single hardware units remains fully independent of each other (asynchronic), and the hardware units are always activated in the operating mode according to the need; therefore, this will significantly facilitate the programming of the functions included in the system. Also, when the functions of the system are being determined by programming, it is now easy to take into account the known delay times for the transfer of the hardware units from the wake up mode to the operating mode.

The following, more detailed description of the invention with examples will more clearly illustrate, for anyone skilled in the art, advantageous embodiments of the invention as well as advantages to be achieved with the invention in relation to prior art.

DESCRIPTION OF THE DRAWINGS

In the following, the invention will be described in more detail with reference to the appended drawings, in which.

DETAILED DESCRIPTION OF THE INVENTION

Figure 1:
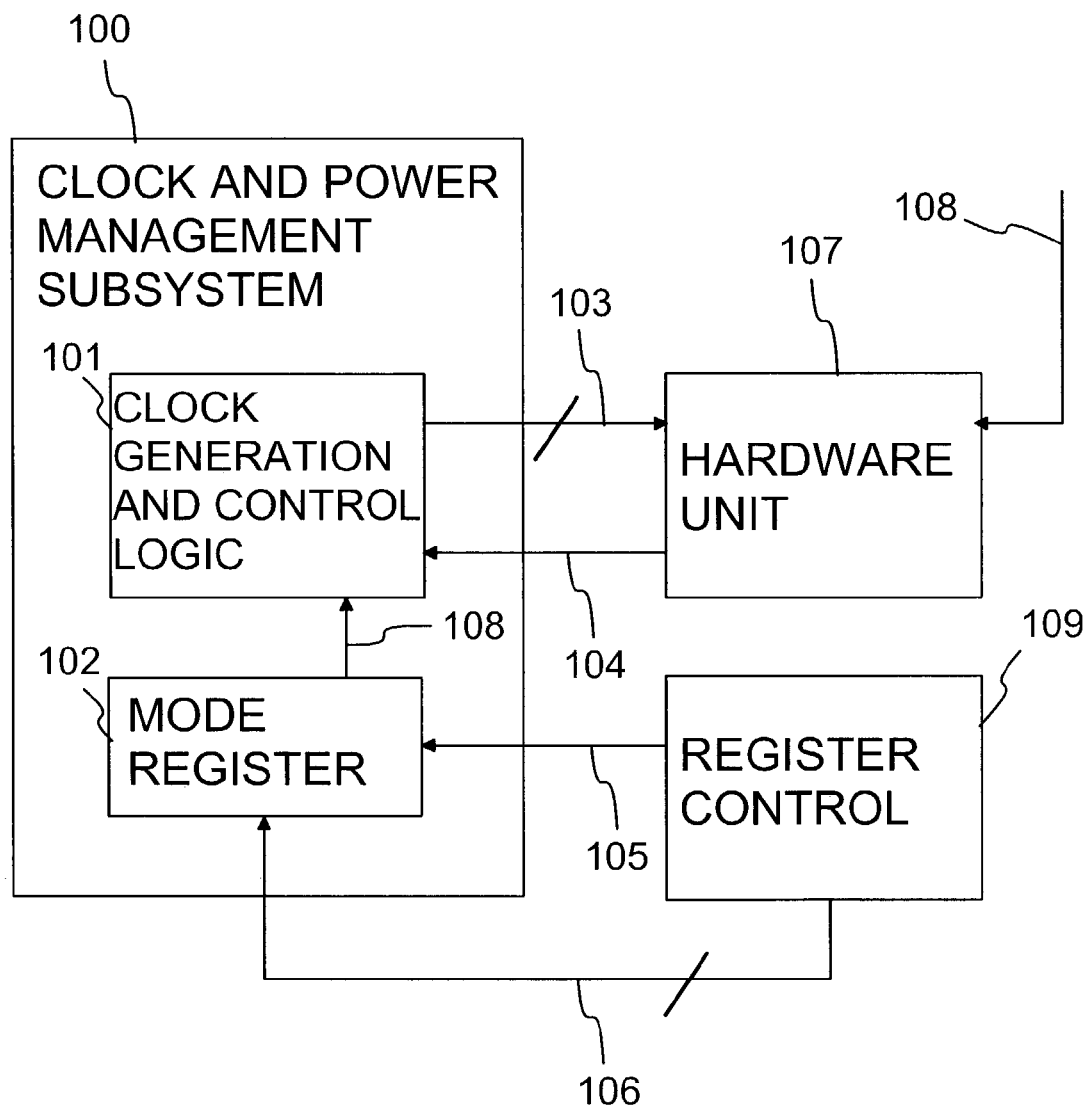
FIG. 1 shows the solution of prior art for controlling the power saving of a hardware unit.

FIG. 1 has already been discussed above in the description of prior art.

Figure 2:
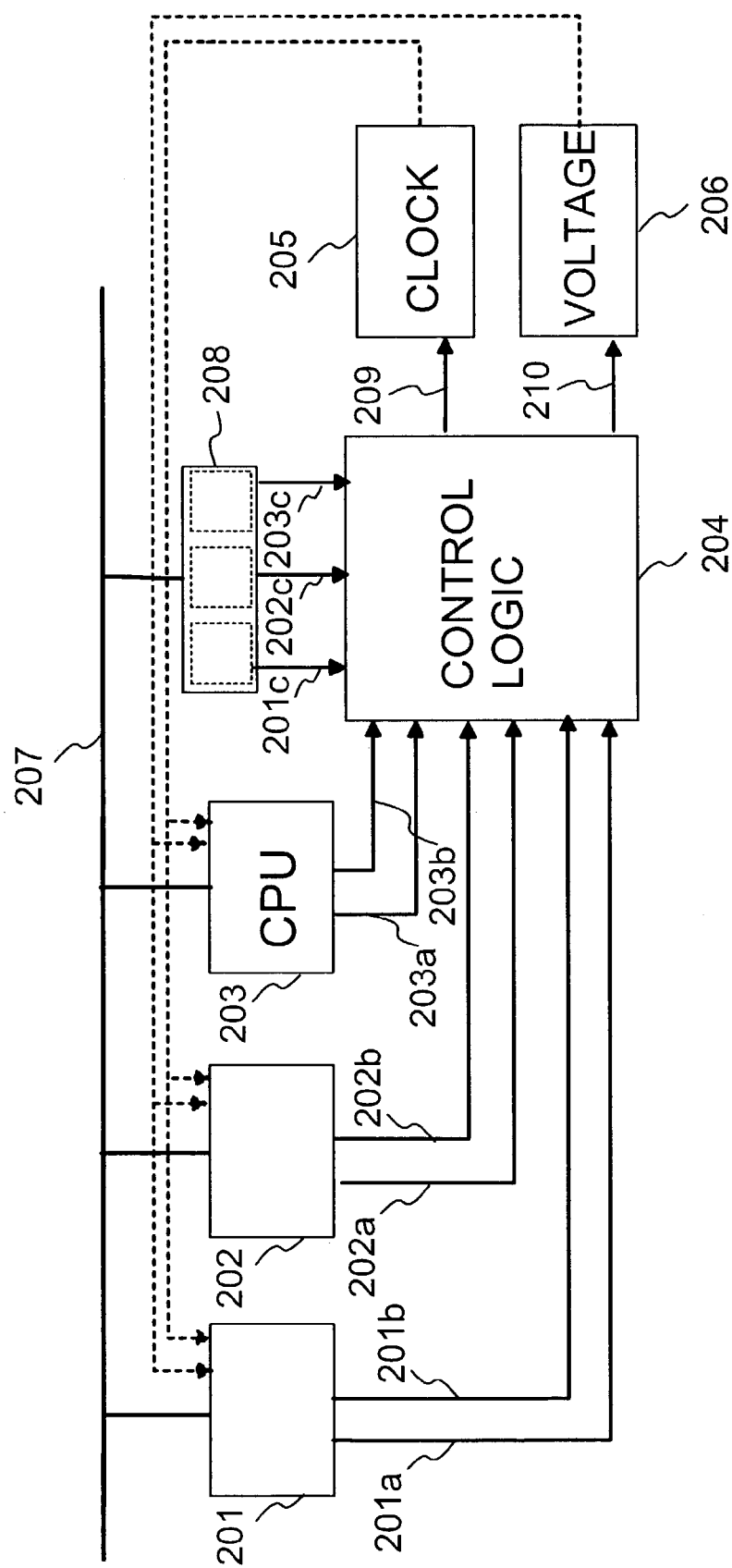
FIG. 2 shows, in principle, an embodiment of the power control system according to the invention.

FIG. 2 shows a system which is preferably implemented on a single ASIC circuit and comprises several hardware units 201–203, a power control logic 204, as well as clock frequency and operating voltage control units 205, 206. The hardware units 201–203 as well as the power control logic 204 are connected to communicate via a bus 207.

According to the invention, each single hardware unit 201–203 can generate a first status signal 201a–203a and a second status signal 201b–203b, which status signals are transferred to the power control logic 204.

Furthermore, requirement signals 201c–203c are transferred to the power control logic 204, transmitting information from a power control mode register 208 to the power control logic 204. The power control mode register 208 contains information for each hardware unit 201–203 about the clock frequency and/or operating voltage to be generated to the single hardware unit in the powered-down mode. In other words, for example the requirement signal 201c informs the control logic 204 about the requirements of the clock frequency and/or the operating voltage determined for the hardware unit 201 in the powered-down mode. In a corresponding manner, the requirement signal 202c transmits information about the requirements of the hardware unit 202 in the powered-down mode.

According to one embodiment of the invention, the system of FIG. 2 operates in the following way.

In connection with turning on of the system or another change of operating mode, the first step is to define the powered-down modes for each hardware unit 201–203, which are stored by the hardware unit 203, i.e. the processor unit 203, in the powered-down mode register 208. In the mode register 208, this data is stored in a memory location which is separately allocated for each hardware unit 201–203 and illustrated in FIG. 2 in principle with broken lines within the mode register 208. The level sensitive requirement signals 201c–203c are now set to indicate, by means of their voltage level, the state of the data stored in said mode register 208 by means of programming.

In the simplest case, only one binary requirement signal 201c–203c is used for each hardware unit 201–203, as shown in FIG. 2, wherein only two separate states can be defined for each hardware unit. In this case, the logical 0 state of the requirement signal can, for example, indicate that no powered-down mode is defined for said hardware unit, and the logical 1 state of the requirement signal indicates that a given powered-down mode is defined.

We shall first discuss the situation solely from the point of view of the hardware unit 201. The first status signal 201a and the second status signal 201b, transferred from the hardware unit 201 to the power control logic 204, are signals to be transferred along separate signal lines which can thus obtain the value of logical 0 or 1.

When the requirement signal 201c indicates, by a value different from the logical 0 state, that a given powered-down mode is defined for the hardware unit 201, and, in a corresponding way, when the first status signal 201a and the second status signal 201b indicate that said hardware unit 201 is idle and thereby free to enter the powered-down mode, the logic circuits contained in the control logic 204 are arranged to combine said signals 201a, 201b, 201c in such a way that the control logic 204 controls, by means of control signals 209, 210, the clock frequency and operating voltage control units 205, 206 to generate the clock frequency and the operating voltage corresponding to said powered-down mode, to the hardware unit 201. When any of the signals 201a, 201b or 201c changes its logical state, the control logic 204 will immediately change the state of the control signals 209, 210 respectively. Thus, the hardware unit 201 will always be supplied with the clock frequency and the operating voltage required by it at the time.

In a situation in which the value of the requirement signal 201c is logical zero, that is, no powered-down mode is defined for the hardware unit 201, the value of the status signals 201b, 201c will have no effect and the control logic 204 will not transfer the hardware unit 201 to a powered-down mode.

When the hardware unit 201 is in the powered-down mode and the hardware unit 201 indicates the state of the first status signal 201a by changing its need to exit the powered-down mode and to enter the wake up mode, the power control logic 204 will react to the change in the logical state of said signal 201a by changing the state of the clock frequency and operating voltage control units 205, 206 in such a way that when the hardware unit 201 further activates its second status signal 201b, the hardware unit 201 will, according to the invention, be transferred, with a known short delay or substantially without a delay, to the actual operating mode.

In the above-mentioned wake up mode, after the first status signal 201a has been activated, the control logic 204 can be arranged, by means of the control units 205, 206, e.g. to activate the crystal oscillator of the system and the logic supplying the frequency of the crystal oscillator with the desired clock frequency, as well as to activate the operating voltage of the hardware unit 201. However, for example the clock signal to be transferred to the hardware unit 201 in the actual operating mode can be enabled until the hardware unit 201 informs, by means of the second status signal 201b, of a need to enter the actual operating mode. In this way, the power consumption of the system is kept low, but the system is ready to exit the wake up mode and to enter the operating mode fast and with a known delay.

The system of FIG. 2 can be implemented so that each single hardware unit 201–203 can be separately supplied with the clock frequencies and operating voltages required by them each time. Thus, the power control logic 204 meets the individual requirements of each hardware unit 201–203 in the same way as presented above for the hardware unit 201.

However, it is typical that the integrated circuit, for example an ASIC, comprising the system of FIG. 2 cannot be used to supply different clock signals or operating voltages to the different hardware units 201–203, but the whole system is arranged to use the same operating voltage or clock signal(s). Thus, the power control logic 204 combines all the status signals 201a–203a, 201b–203b and the requirement signals 201c–203c in such a way that the control of the clock frequency and operating voltage control units 205, 206 is performed by selecting the "highest" of the prevailing requirements; in other words, the clock frequency and the operating voltage of the system are set to meet the needs of the most active hardware unit 201–203.

Figure 3:
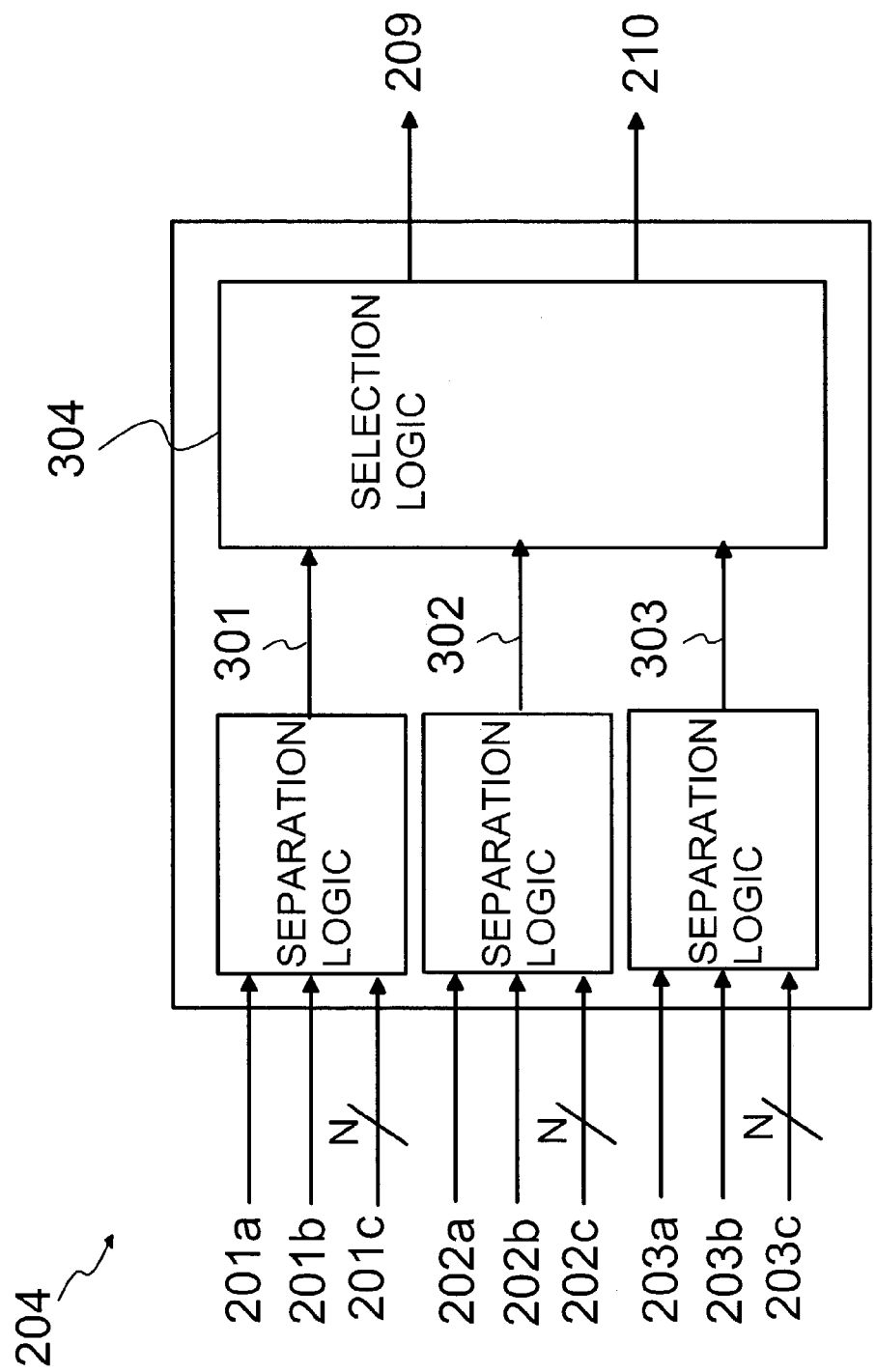
FIG. 3 shows, in principle, an embodiment of the power control logic according to the invention.

FIG. 3 illustrates, in principle, the functions of the power control logic 204 in said situation, in which several (N) parallel requirement signals 201c–203c are used for each hardware unit 201–203. The use of several parallel requirement signals for one hardware unit makes it possible to define several powered-down modes of different levels for said hardware unit in the mode register 208 (not shown). The different levels of the powered-down modes vary with respect to the clock frequency and/or operating voltage required by the hardware unit, wherein different power savings are achieved with said modes.

The control logic 204 shown in FIG. 3 is arranged to generate the signals 201a–203a, 201b–203b and 201c–203c by combining the control signals 209, 210 used in the control of the control units 205, 206 (not shown in FIG. 3) in such a way that said control signals 209, 210 are generated to meet the needs of the hardware unit with the highest requirements (power demand). Thus, in FIG. 3, the signals 301–303 within the control logic 204 correspond to the demand of each hardware unit 201–203, of which the selection logic 304 is further arranged to select the highest demand to generate the control signals 209, 210.

In a way characteristic to the invention, each hardware unit generates its first and second status signals independently. The processor unit 203 included in the system can, for example, inform the hardware unit 201 about an operation which the hardware unit 201 should execute at a given moment of time. If the processor unit 203 itself is then idle, the processor unit 203 can also enter the powered-down mode by changing the state of its status signals 203a, 203b.

On the basis of said information, the hardware unit 201 starts an internal event counter whose operation will be described as follows. After receiving information about a future event from the processor unit 203, the hardware unit 201 starts a so-called first counter and then enters the powered-down mode, in which preferably all the other functions of the hardware unit 201 except said first counter are turned off. To save power, the counter function can be arranged to operate by means of a decelerated clock signal and/or a lowered operating voltage. The initial value stored by programming in the first counter is a value which corresponds, from the starting moment of the first counter, to the period of time, after which the hardware unit 201 should enter the wake up mode according to the invention. In other words, after the value of the first counter has been counted from the initial value down to zero, the hardware unit 201 generates the first status signal 201, wherein the power control logic 204 transfers the hardware unit 201 to the wake up mode according to the invention. In the hardware unit 201, this event will now start a so-called second counter, in which, in the corresponding way, the stored initial value is the value which corresponds, from the starting moment of the second counter, the period of time, after which the hardware unit 201 must be in the operating mode. After the second counter has counted down to zero, the hardware unit 201 generates the second status signal 201b, wherein the power control logic 204 transfers the hardware unit 201 to the operating mode.

In the operating mode, the hardware unit 201 is immediately ready to process the required operation, which may take place, for example, in such a way that the hardware unit 201 transmits an interrupt message to the processor unit 203, after which the processor unit 203 executes the required service. The processor unit 203 has, independently by means of its own internal counter function, activated its own status signals in such a way that also the processor unit is in the operating mode at the same time as the hardware unit 201.

According to the invention, the initial value to be programmed in the second counter must thus be at least equal to or slightly higher than the time required for the transfer of the hardware unit from the wake up mode to the operating mode.

By programming the initial value of the second counter in a suitable way, it is, according to the invention, possible to secure that the hardware unit is transferred from the wake up mode to the operating mode with a known delay, and the readiness of the hardware unit to operate at a given moment of time can thus always be secured.

Consequently, it is an essential advantage of the invention that the invention makes aggressive power saving possible at the same time when it secures in all situations that the system is energized to the operating mode with a delay which is precisely known in advance. In the solution according to the invention, the operation of different hardware units remains independent of each other and the programming of the functions of the system becomes significantly easier, because in the programming, it is possible to take into account the known delay times for the transfer from the wake up mode to the operating mode.

By means of the invention, there is no need to maintain information about the status of the different hardware units in the system, by using for example a processor and a state machine. Thus, also the processor unit can be in the powered-down mode for a maximum time. The operation of the hardware based control logic 204 implemented with logic circuits is fast and involves no delays, enabling a fast and faultless operation.

By combining the modes and system structures presented in connection with the above embodiments of the invention, it is possible to provide various embodiments of the invention which comply with the spirit of the invention. Therefore the above-presented examples must not be interpreted to restrict the invention, but the embodiments of the invention can be freely varied within the scope of the inventive features presented in the claims hereinbelow.

The invention claimed is:

1. A method for dynamic power control in an electronic system implemented on an integrated circuit, which electronic system comprises at least one hardware unit, a hardware based power control logic implemented using logic circuits and a programmable power control mode register containing information about powered-down modes defined for said hardware units, in which method
   a single hardware unit transmits, by means of a hardware-unit-specific level-sensitive status signal, information about its activity to the power control logic,
   the power control mode register transmits, by means of a hardware-unit-specific level-sensitive requirement signal, information to the power control logic about the powered-down mode defined into said mode register by programming, wherein
   the power control logic combines said status signal and said requirement signal and, on the basis of this, transfers said hardware unit from the powered-down mode to the operational mode by influencing the clock frequency, or the clock frequency together with the operating voltage to be supplied to said hardware unit by a clock frequency control unit and an operating voltage control unit,
   wherein to transfer a single hardware unit from the powered-down mode to the operational mode, said hardware unit transmits to the power control logic
   a first level-sensitive status signal for transferring said hardware unit from the powered-down mode to a wake up mode, and further
   a second level-sensitive status signal for transferring said hardware unit from the wake up mode to the actual operational mode.

2. A power control system for dynamic power control in an electronic system implemented on an integrated circuit, which electronic system comprises at lease one hardware unit, a hardware based power control logic implemented using logic circuits, and a programmable power control mode register containing information about powered-down modes defined for said hardware unit, in which power control system a single hardware unit is arranged to transmit, by means of a hardware-unit-specific level-sensitive status signal, information about its activity to the power control logic, the power control mode register is arranged to transmit, by means of a hardware-unit-specific level-sensitive requirement signal, information to the power control logic about the powered-down mode defined into said mode register by programming for a single hardware unit, wherein the power control logic is arranged to combine said status signal and said requirement signal for transferring said hardware unit from the powered-down mode to the operational mode by influencing the clock frequency, or the clock frequency together with the operating voltage to be supplied to said hardware unit by a clock frequency control unit and an operating voltage control unit, wherein to transfer a single hardware unit from the powered-down mode, said hardware unit is arranged to transmit to the power control logic a first level-sensitive status signal for transferring said hardware unit from the powered-down mode to a wake up mode, and further a second level-sensitive status signal for transferring said hardware unit from the wake up mode to the actual operational mode.

3. The power control system according to claim 2, wherein the first and second hardware-unit-specific level-sensitive status signals as well as the hardware-unit-specific requirement signal are all binary digital signals, which signals have two different logical states, 0 and 1.

4. The power control system according to claim 3, wherein several parallel binary requirement signals are used to define several powered-down modes for one hardware unit.

5. The power control system according to claim 2 wherein the power control logic is arranged to individually meet the requirements of each hardware unit with respect to the clock frequency and/or operating voltage.

6. The power control system according to claim 2, wherein the power control logic is arranged to combine the first and second status signals of several hardware units, and to supply all of said hardware units with the same clock frequency/frequencies and/or operating voltage/voltages according to the requirements of the most active hardware unit.

7. The power control system according to claim 2, wherein the single hardware unit comprises means for activating said first and second status signals at a moment of time which has been predetermined by software.

8. The power control system according to claim 7, wherein said means are arranged to operate at a reduced clock frequency and/or at a reduced operating voltage.

9. The power control system according to claim 2, wherein the power control system is arranged to be used in application specific integrated circuits (ASIC).

10. The power control system according to claim 2, wherein the power control system is arranged to be used in a mobile station.

* * * * *